US012692648B2

(12) United States Patent
Oak et al.

(10) Patent No.: US 12,692,648 B2
(45) Date of Patent: Jul. 28, 2026

(54) GARMENT CARE APPARATUS

(71) Applicant: Samsung Electronics Co., Ltd.,
Suwon-si (KR)

(72) Inventors: Seongmin Oak, Suwon-si (KR);
Chulkie Park, Suwon-si (KR); **Sangho
Shin**, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 854 days.

(21) Appl. No.: 16/946,843

(22) Filed: Jul. 8, 2020

(65) Prior Publication Data

US 2021/0010193 A1      Jan. 14, 2021

(30) Foreign Application Priority Data

Jul. 12, 2019      (KR) ........................ 10-2019-0084741

(51) Int. Cl.
D06F 58/10          (2006.01)
B01D 29/05          (2006.01)
(Continued)

(52) U.S. Cl.
CPC ............. D06F 58/10 (2013.01); B01D 29/05
(2013.01); B01D 29/56 (2013.01); D06F
39/085 (2013.01);
(Continued)

(58) Field of Classification Search
CPC ........ D06F 58/10; D06F 58/203; D06F 58/24;
D06F 39/008; D06F 39/085; D06F 39/10;
D06F 87/00; B01D 29/05; B01D 29/56
See application file for complete search history.

(56) References Cited

U.S. PATENT DOCUMENTS 5,755,040 A * 5/1998 Ou ........................ D06F 58/10
34/225
7,866,061 B2 * 1/2011 Tatsumi ................ D06F 58/206
34/607
(Continued)

FOREIGN PATENT DOCUMENTS

CN          101410566 A      4/2009
CN          202730492 U      2/2013
(Continued)

OTHER PUBLICATIONS

Communication pursuant to Article 94(3) EPC dated Dec. 6, 2024,
in connection with European Patent Application No. 20840895.5, 5
pages.
(Continued)

*Primary Examiner* — Michael G Hoang
*Assistant Examiner* — Bao D Nguyen

(57)          ABSTRACT

A garment care apparatus includes a care chamber including
a first area including a first bottom plane, and a second area
including a second bottom plane located lower than the first
bottom plane so that the garment care apparatus may accom-
modate and care for garments with normal lengths in the first
area and garments longer than the normal garments in the
second area. The second bottom plane includes a drain outlet
arranged in a front end portion of the second bottom plane
to discharge water, and an inclined portion tilted down from
a rear wall of the care chamber toward the drain outlet.

20 Claims, 8 Drawing Sheets

(51) Int. Cl.

| | |
|---|---|
| *B01D 29/56* | (2006.01) |
| *D06F 39/08* | (2006.01) |
| *D06F 39/10* | (2006.01) |
| *D06F 39/40* | (2024.01) |
| *D06F 58/20* | (2006.01) |
| *D06F 58/24* | (2006.01) |
| *D06F 87/00* | (2006.01) |

(52) U.S. Cl.

CPC .............. *D06F 39/10* (2013.01); *D06F 39/40* (2024.01); *D06F 58/203* (2013.01); *D06F 58/24* (2013.01); *D06F 87/00* (2013.01)

(56) References Cited

U.S. PATENT DOCUMENTS

| | | | | |
|---|---|---|---|---|
| 8,061,066 | B2 | 11/2011 | Hong et al. | |
| 8,132,339 | B2 * | 3/2012 | Moon | D06F 58/10 |
| | | | | 8/158 |
| 8,136,273 | B2 * | 3/2012 | Kim | D06F 58/10 |
| | | | | 38/14 |
| 9,506,185 | B2 | 11/2016 | Choi et al. | |
| RE49,371 | E | 1/2023 | Ahn et al. | |
| 11,680,362 | B2 | 6/2023 | Choi et al. | |
| 2009/0151205 | A1 | 6/2009 | Kim et al. | |
| 2010/0088919 | A1 | 4/2010 | Yang et al. | |
| 2014/0238086 | A1 * | 8/2014 | Choi | D06F 58/20 |
| | | | | 68/20 |
| 2015/0000353 | A1 | 1/2015 | Wang et al. | |
| 2015/0020419 | A1 * | 1/2015 | Park | D06F 71/30 |
| | | | | 38/3 |
| 2020/0217055 | A1 * | 7/2020 | Robillard | E03F 5/0407 |

FOREIGN PATENT DOCUMENTS

| | | | |
|---|---|---|---|
| JP | 2002-239297 | A | 8/2002 |
| KR | 20-0120547 | Y1 | 7/1998 |
| KR | 10-2007-0110698 | A | 11/2007 |
| KR | 10-0782377 | B1 | 12/2007 |
| KR | 10-0826205 | B1 | 4/2008 |
| KR | 10-2009-0069755 | A | 7/2009 |
| KR | 10-2014-0108454 | A | 9/2014 |
| KR | 10-2014-0108455 | A | 9/2014 |
| KR | 10-2018-0052956 | A | 5/2018 |
| KR | 10-2018-0132591 | A | 12/2018 |
| WO | 2019018722 | A2 | 1/2019 |

OTHER PUBLICATIONS

International Search Report dated Nov. 6, 2020 in connection with International Patent Application No. PCT/KR2020/009022, 3 pages.
Notification of the First Office Action dated Aug. 23, 2023, in connection with Chinese Application No. 202080050821.X, 14 pages.
Supplementary European Search Report dated May 25, 2022, in connection with European Application No. 20840895.5, 8 pages.
Notification of the Second Office Action dated Mar. 29, 2024, in connection with Chinese Patent Application No. 202080050821.X, 12 pages.
Notice of Preliminary Rejection dated Jul. 19, 2024, in connection with Korean Application No. 10-2019-0084741, 13 pages.
Communication under Rule 71(3) EPC dated Jun. 16, 2025, in connection with European Application No. 20840895.5, 37 pages.

* cited by examiner

GARMENT CARE APPARATUS

CROSS-REFERENCE TO RELATED APPLICATION

This application is based on and claims priority under 35 U. S. C. § 119 to Korean Patent Application No. 10-2019-0084741 filed on Jul. 12, 2019, the disclosure of which is incorporated herein by reference in its entirety.

BACKGROUND

1. Field

The disclosure relates to a garment care apparatus capable of removing dust or odors from clothes.

2. Description of Related Art

A garment care apparatus is a device for performing garment care such as drying wet clothes, removing dust or odors from clothes, reducing wrinkles from clothes, etc.

The garment care apparatus includes a main body that defines a care chamber to contain garments and a door to open or close the care chamber.

The garment care apparatus also includes refrigeration cycle components for supplying hot wind to the care chamber containing the garments to care the garments, and a steam generating device for performing refresh functions such as removing wrinkles, odors, static electricity, etc., from the garments.

The main body includes a machine room arranged below the care chamber for accommodating the refrigeration cycle components and the steam generating device. A water discharge tub for collecting water produced from the care chamber and a water supply tub for storing water to be used by the steam generating device are detachably installed in front of the machine room.

For this garment care apparatus, the top of the care chamber has a limited height to make it easy for the user to use the care chamber, and the bottom of the care chamber has more than a certain height because the machine room is arranged under the care chamber.

Hence, it is difficult to increase the length from the top to the bottom of the care chamber by more than a certain length.

SUMMARY

The disclosure provides a garment care apparatus capable of accommodating and caring for garments longer than normal clothes.

According to an aspect of the disclosure, a garment care apparatus includes a main body; and a care chamber arranged in the main body to accommodate garments, wherein the care chamber includes a first area including a first bottom plane, a second area including a second bottom plane located lower than the first bottom plane, and a drain outlet arranged in a front end portion of the second bottom plane to discharge water.

The second bottom plane may include an inclined plane tilted down from a rear wall of the care chamber toward the drain outlet.

The second bottom plane may include a first inclined portion extending from the rear wall of the care chamber at a first inclination angle, and a second inclined portion extending from a front end of the first inclined portion at a second inclination angle greater than the first inclination angle.

The garment care apparatus may further include: a machine room arranged below the first area, and the first inclined portion may be tilted down from a side of the care chamber toward the machine room.

The garment care apparatus may further include a filter net arranged at the drain outlet for filtering foreign materials, and a grill member covering and concealing the filter net.

The garment care apparatus may further include a machine room arranged below the first area, a lower outlet arranged on the first bottom plane, a lower outlet duct guiding air discharged through the lower outlet, a first water collector arranged in a lower portion of the lower outlet duct for collecting water brought into the lower outlet duct, and a water discharge tray installed below the drain outlet for collecting water brought in through the drain outlet.

The first water collector may be located lower than the water discharge tray.

The water discharge tray may include a bottom plane tilted down toward the first water collector.

The garment care apparatus may further include a first water collecting pipe tilted down toward the first water collector, with one end coupled to the water discharge tray and the other end coupled to the first water collector.

The garment care apparatus may further include a water discharge tub into which water is discharged, a pump configured to pump water to be discharged into the water discharge tub, a first drain pipe guiding water from the first water collector to the pump, a second drain pipe guiding water discharged from the pump to the water discharge tub, and a first water collecting pipe tilted down toward the first drain pipe, with one end coupled to the water discharge tray and the other end coupled to the first drain pipe.

The garment care apparatus may further include an evaporator and a condenser dehumidifying air, and a lower blower forcing air to pass the evaporator and the condenser.

The lower blower may include the lower outlet duct, a lower fan forcing air to flow, and a lower inlet duct guiding air discharged from the lower fan to the care chamber and accommodating the evaporator and the condenser, and the lower inlet duct may include a second water collector arranged below space, in which the evaporator and the condenser are accommodated, for collecting water.

The garment care apparatus may further include a second water collecting pipe with one end coupled to the second water collector and the other end coupled to the lower outlet duct.

According to another aspect of the disclosure, a garment care apparatus may include a main body; and a care chamber arranged in the main body to accommodate garments, wherein the care chamber includes a first area having first vertical length and a second area located side by side with the first area and having second vertical length greater than the first vertical length, wherein the second area includes a bottom plane at which a drain outlet is arranged for discharging water, and wherein the bottom plane of the second area includes an inclined plane tilted down toward the drain outlet.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
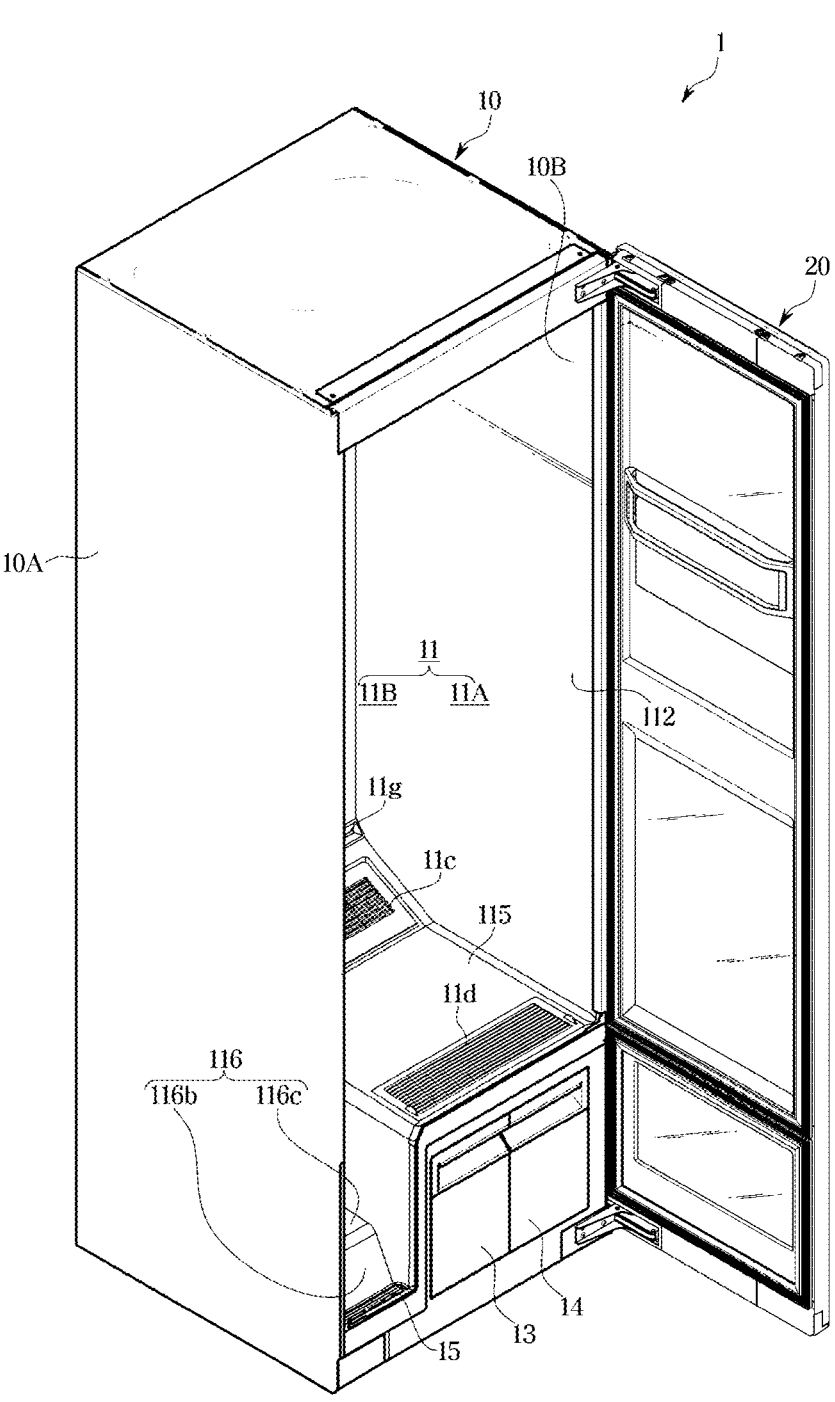
FIG. 1 illustrates a perspective view of a garment care apparatus with a door open, according to an embodiment of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure.

Reference will now be made in detail to embodiments of the disclosure, which are illustrated in the accompanying drawings, wherein like reference numerals refer to the like elements throughout.

Figure 2:
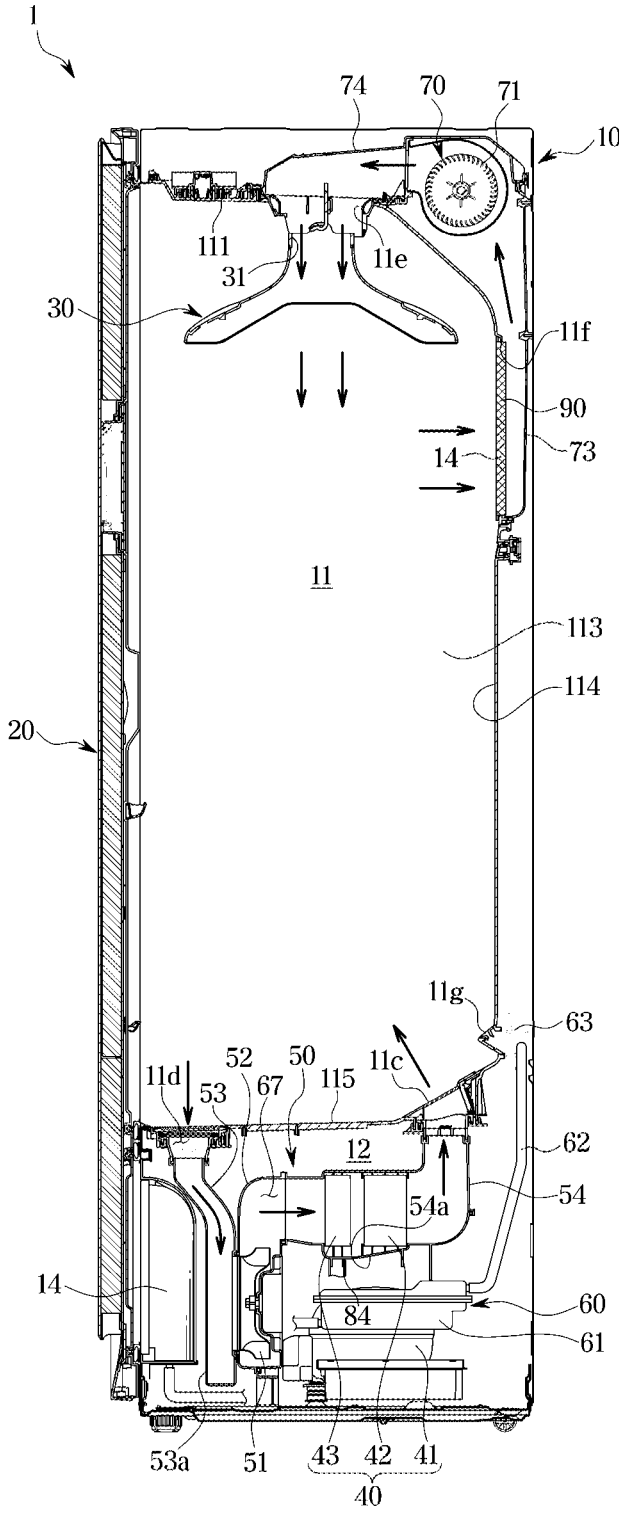
FIG. 2 illustrates a side cross-sectional view of a garment care apparatus, according to an embodiment of the disclosure.

FIG. 1 illustrates a perspective view of a garment care apparatus with a door open, according to an embodiment of the disclosure, and FIG. 2 illustrates a side cross-sectional view of a garment care apparatus, according to an embodiment of the disclosure.

Referring to FIGS. 1 and 2, a garment care apparatus 1 includes a main body 10 defining the exterior and a door 20 pivotally coupled to the main body 10.

The main body 10 also defines a care chamber 11 shaped like a rectangular parallelepiped to accommodate garments.

The door 20 is pivotally installed on a front edge of the main body 10 to open or close the care chamber 11.

The main body 10 includes an outer case 10A defining the exterior, and an inner case 10B placed inside the outer case 10A to define the care chamber 11.

The care chamber 11 includes a top plane, both side walls 112 and 113, a rear wall 114, and bottom planes 115 and 116, and there is a supporting member 30 having the form of a hanger to hold a garment placed inside the care chamber 11.

The supporting member 30 is installed on the top plane 111 of the care chamber 11, and air may flow via the inside of the supporting member 30. The air supplied into the supporting member 30 is applied to the garment hung on the supporting member 30 to remove dust or foreign materials from the garment.

The supporting member 30 includes an air hole 31 through which to supply air to the garment. The air hole 31 is formed at the top end of the supporting member 30, and air is supplied to the supporting member 30 through the air hole 31.

The supporting member 30 is detachably installed in the care chamber 11. There may be a plurality of supporting members 30, which may be selectively installed and used by the user in the care chamber 11 as they may be detachable.

The main body 10 includes a machine room 12 arranged below the care chamber 11. The machine room 12 is formed with space under the care chamber 11 partitioned by the inner case 10B. The machine room 12 accommodates components of a refrigeration cycle to dehumidify or heat the air in the care chamber 11.

The care chamber 11 includes a first area 11A arranged on one side and having first vertical length, and a second area 11B arranged on the other side and having second vertical length larger than the first vertical length.

The second area 11*b* is placed next to the first area 11A, i.e., the first area 11A and the second area 11B are arranged side by side in the left-right direction. In the drawings, the first area 11A is on the right of the care chamber 11 and the second area 11B is on the left of the care chamber 11. The arrangement of the first and second areas 11A and 11B is not, however, limited thereto, and conversely, the first area 11A may form the left portion of the care chamber 11 and the second area 11B may form the right portion of the care chamber 11.

The bottom plane includes a first bottom plane 115 corresponding to the bottom of the first area 11A and a second bottom plane 116 corresponding to the bottom of the second area 11B. The second bottom plane 116 is lower than the first bottom plane 115 by about 40.5 cm, i.e., the vertical length of the second area 11B is greater than that of the first area 11A.

The difference in length between the first and second areas 11A and 11B, which is about 40.5 cm, is just an example, but is not limited thereto. It is also possible that the vertical length of the second area 11B is greater than that of the first area 11A by about 20 cm or more.

As such, the first area 11A may be formed to have shorter vertical length than the second area 11B, and the machine room 12 is formed under the first area 11A.

The top planes of the first and second areas 11A and 11B are coplanar, but the second bottom plane 116 of the second area 11B is lower than the first bottom plane 115 of the first area 11A. Accordingly, the second area 11B may accommodate longer garments than the first area 11A does.

Figure 4:
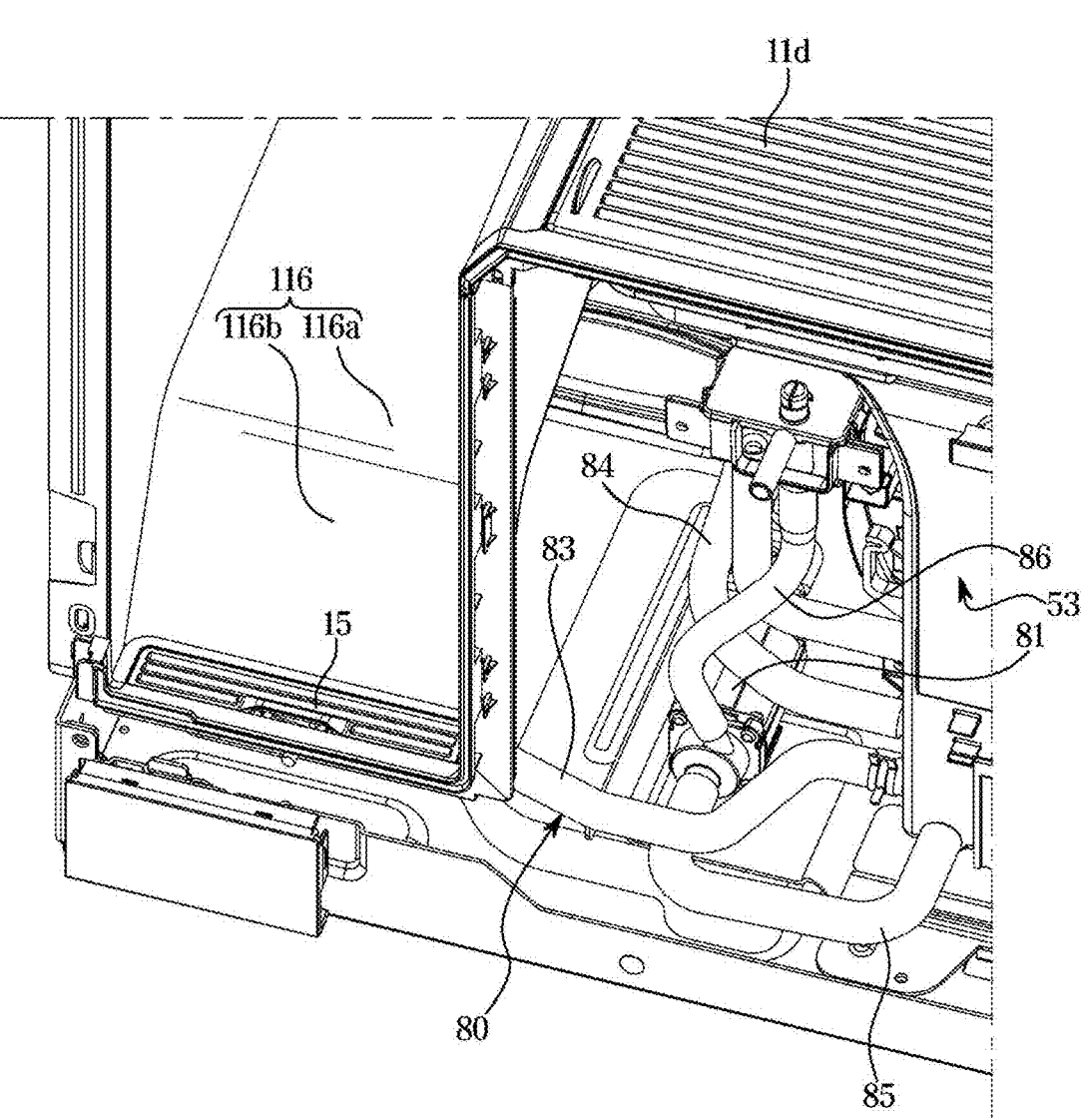
FIG. 4 illustrates a perspective view of a drain system included in a garment care apparatus, according to an embodiment of the disclosure.

The care chamber 11 is equipped with a lower inlet 11c, a lower outlet 11d, an upper inlet 11e, an upper outlet 11f, a steam inlet 11g, and a drain outlet 11h (see FIG. 4).

The lower inlet 11c is formed in a rear portion of the first bottom plane 115 of the care chamber 11, and the lower outlet 11d is formed in a front portion of the first bottom plane 115 of the care chamber 11.

The upper inlet 11e is formed on the top plane of the care chamber 11 and the upper outlet 11f is formed in an upper rear portion of the care chamber 11.

The upper inlet 11e of the care chamber 11 is coupled to the supporting member 30. Air brought in through the upper inlet 11e is moved into the supporting member 30 through the air hole 31 and then moved to the garment hung on the supporting member 30.

The steam inlet 11g may be arranged in a lower portion of the rear wall of the care chamber 12a. The steam inlet 11g is placed higher than the lower inlet 11c.

Figure 3:
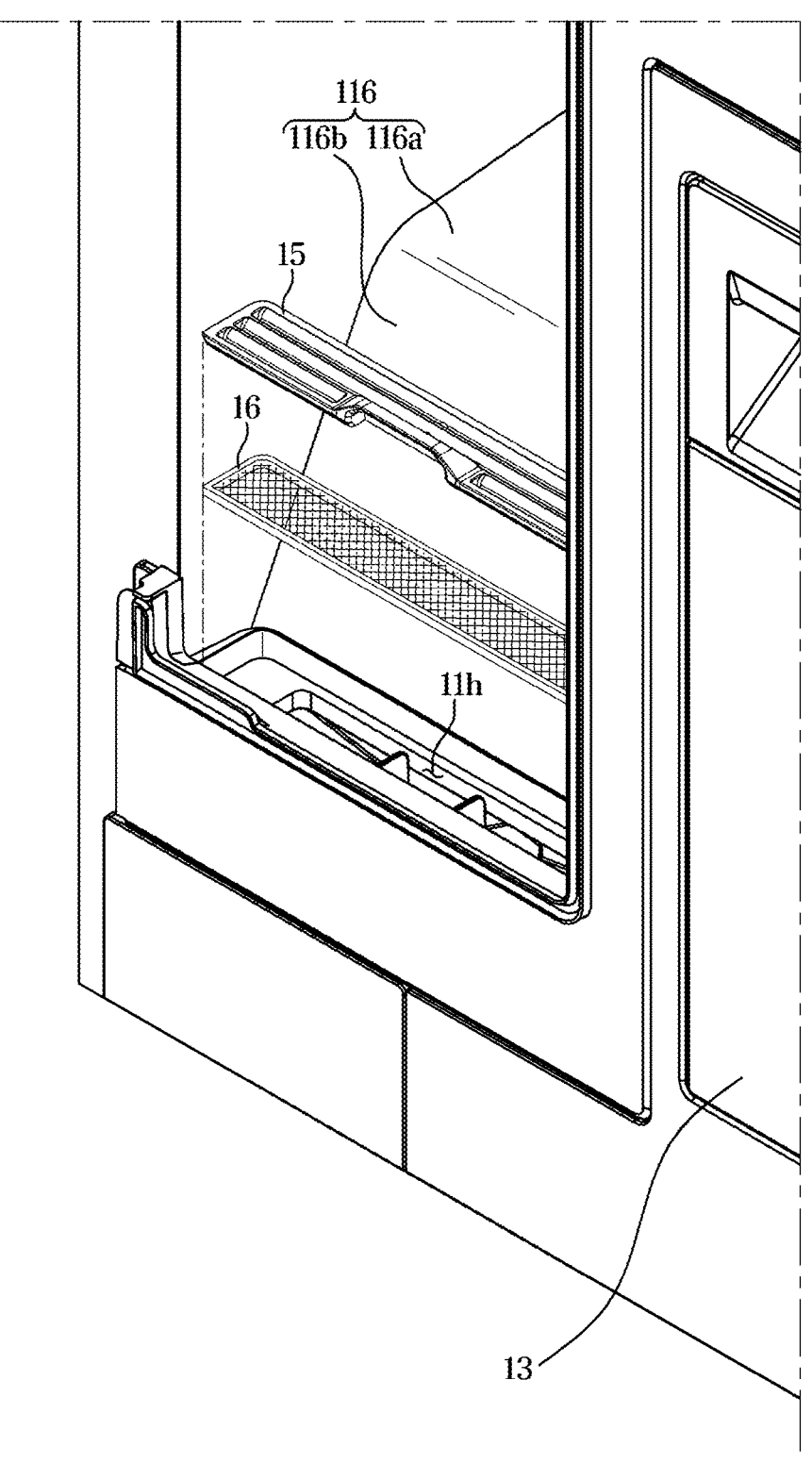
FIG. 3 illustrates an exploded view of a garment care apparatus illustrating a drain outlet, according to an embodiment of the disclosure.

The drain outlet 11h is formed in a front portion of the second bottom plane 116 of the care chamber 11, extending lengthwise from left to right, as shown in FIG. 3. Water flowing along walls and the second bottom plane 116 of the second area 11B of the care chamber 11 is drained through the drain outlet 11h.

The drain outlet 11h includes a drain grill 15 and a filter net 16 to prevent inflow of foreign materials. The drain grill 15 is arranged above the filter net 16 to cover and conceal the filter net 16 for filtering relatively large-sized foreign materials. The filter net 16 is arranged underneath the drain grill 15 to filter small-sized foreign materials that have passed through the drain grill 15. Like the drain outlet 11h, the filter net 16 and the drain grill 15 are formed lengthwise from left to right.

As shown in FIG. 4, the second bottom plane 116 of the care chamber 11 is formed as an inclined plane tilted down from the rear wall of the care chamber 11 toward the front where the drain outlet 11h is placed to guide water into the drain outlet 11h.

The second bottom plane 116 of the care chamber 11 may include a first inclined portion 116a tilted down from the rear wall 113 of the care chamber 11 toward the front at a first inclination angle, and a second inclined portion 116b tilted down from the front end of the first inclined portion 116a toward the front at a second inclination angle which is greater than the first inclination angle. This is for the inner case 10B defining the care chamber 11 to be easily taken out from a mold for manufacturing the inner case 10B.

As shown in FIG. 1, the water discharge tub 13 and the water supply tub 14 are installed in front of the machine room 12.

The water discharge tub 13 collects water produced from the care chamber 11 and the refrigeration cycle, and is detachably installed in the main body 10. Accordingly, when the water level in the water discharge tub 13 is higher than a certain level, the user may detach and empty the water discharge tub 13 by throwing away the water, and then attach the water discharge tub 13 back to the main body 10 for use.

The water supply tub 14 stores water for the steam generating device 60 to produce steam, and is detachably installed in the main body 10. Accordingly, when the water level in the water supply tub 14 is lower than a certain level, the user may detach and fill the water supply tub 14 with water, and then attach the water supply tub 14 back to the main body 10 for use.

As shown in FIG. 2, components for the refrigeration cycle 40 for heating and dehumidifying the air in the care chamber 11 are arranged in the machine room 12 as needed.

The refrigeration cycle 40 includes a compressor 41 for compressing refrigerant, a condenser 42 for exchanging heat between the refrigerant and air to cool the refrigerant and heat the air, an expansion valve for decompressing and expanding the refrigerant, and an evaporator 43 for allowing the refrigerant to absorb heat from the air, thereby evaporating the refrigerant while cooling down the air.

Hence, while the air is passing the evaporator 43, the air is cooled and moisture contained in the air is condensed, so that condensed water is produced and dehumidification is performed; while the air is passing the condenser 42, the air is heated so that dehumidified and heated air may be supplied into the care chamber 11.

The machine room 12 includes a lower blower 50 for forcing the air in the care chamber 11 to pass the evaporator 43 and the condenser 42 and then be supplied back to the care chamber 11.

The lower blower 50 includes a lower fan 51 for forcing air to flow, a lower fan case 52 for covering the lower fan 51, a lower outlet duct 53 for guiding the air of the care chamber 11 discharged through the lower outlet 11d to the lower fan 51, and a lower inlet duct 54 for guiding the air discharged from the lower fan 51 to flow into the care chamber 11.

The lower outlet duct 53 connects the lower outlet 11d to the lower fan case 52, and the lower inlet duct 54 connects the lower inlet 11c to the lower fan case 52.

The condenser 42 and the evaporator 43 are accommodated in the lower inlet duct 54 to dehumidify and heat the air passing the lower inlet duct 54.

Accordingly, as the lower fan 51 is rotated, the air in the care chamber 11 flows into the lower fan case 52 through the lower outlet 11d and the lower outlet duct 53, is dehumidified and heated while passing the lower inlet duct 54, and flows back into the care chamber 11 through the lower inlet duct 54.

The lower inlet 11c is arranged in a rear portion of the care chamber 11 and the lower outlet 11d is arranged in a front portion of the care chamber 11, as described above, but the arrangement of the lower inlet 11c and the lower outlet 11d is not limited thereto. The locations of the lower inlet 11c and the lower outlet 11d may be variously changed as required.

Furthermore, the steam generating device 60 for producing steam is arranged in the machine room 12.

The steam generating device 60 is connected to the water supply tub 14 for receiving water from the water supply tub 14 to produce steam.

The steam generating device 60 includes a steam generator 61 for producing steam by applying heat to the water supplied from the water supply tub 14, a steam supply pipe 62 for guiding the steam produced from the steam generator 61 to the steam inlet 11g, and a steam injector 63 arranged at the steam inlet 11g and shaped like a nozzle to inject steam. The steam produced from the steam generator 61 is moved to the steam inlet 11g through the steam supply pipe 62 and injected into the care chamber 11 through the steam injector 63.

The main body 10 includes an upper blower 70 arranged in an upper portion of the main body 10 to circulate air inside the care chamber 11. The upper blower 70 includes an upper fan 71 for circulating air, an upper fan case 72 for covering the upper fan 71, an upper outlet duct 73 for guiding the air of the care chamber 11 to the upper fan case 72, and an upper inlet duct 74 for guiding the air discharged from the upper fan 71 into the care chamber 11.

The upper outlet duct 73 connects between the upper outlet 11f and the upper fan case 72, and the upper inlet duct 74 connects between the upper inlet 11e and the upper fan case 72.

A filter 90 is arranged at the upper outlet 11f. The filter 90 serves to capture foreign materials like dust contained in the passing air or remove odors.

The supporting member 30 is installed at the lower inlet 11c to connect between the lower inlet 11c and the air hole 31 of the supporting member 30. Accordingly, the air is brought to the air hole 31 in the supporting member 30 through the lower inlet 11c.

Hence, the foreign materials are filtered and odors are removed by the filter 90 in the process of the air in the care chamber 11 being discharged through the upper outlet 11f. The air is moved into the upper fan case 72 with the upper fan 71 installed therein through the upper outlet duct 73, and forced by the upper fan 71 to pass through the upper outlet duct 73 and the upper outlet 11f to the air hole 31 of the supporting member 30. The air is applied to the garment hung on the supporting member 30 through the air hole 31 to remove foreign materials and odors from the garment.

Figure 5:
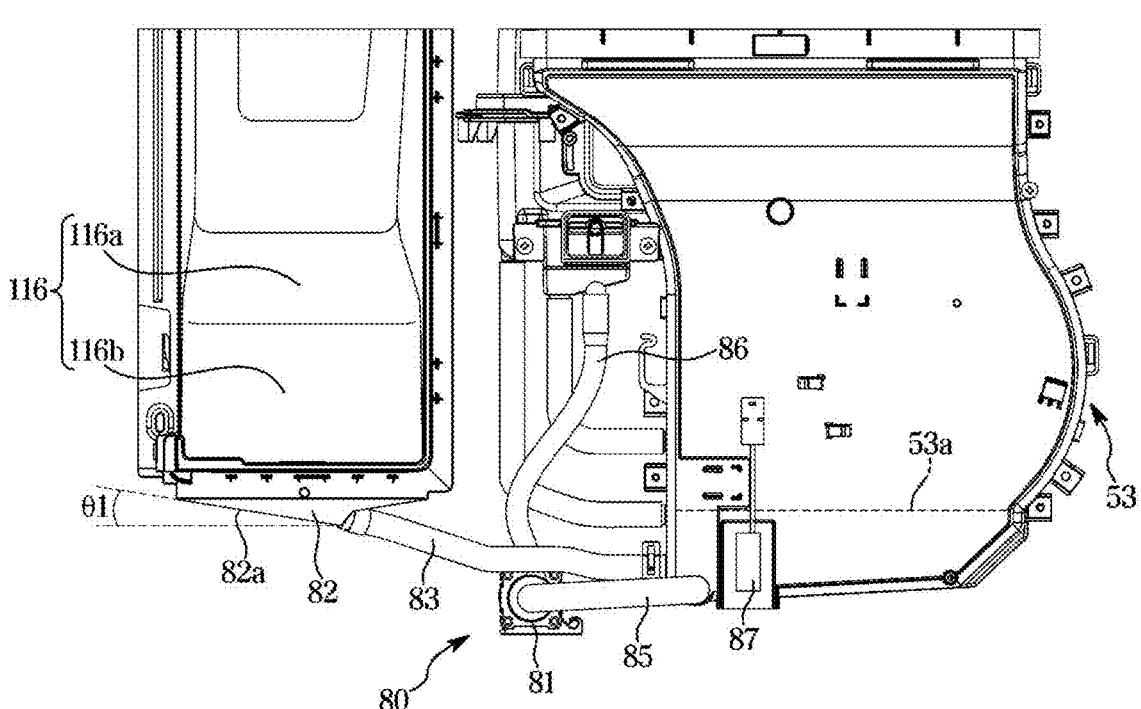
FIG. 5 illustrates a front view of a drain system included in a garment care apparatus, according to an embodiment of the disclosure.

The garment care apparatus 1 may include a drain system 80 to discharge the water produced from the evaporator 43 and the condenser 42 or the care chamber 11 to the water discharge tub 13, as shown in FIGS. 4 and 5.

There is a first water collector 53a formed in a lower portion of the lower outlet duct 53 for collecting the water brought into the lower outlet duct 53, and a second water collector 54a formed in a portion of the lower inlet duct 54 below the space where the condenser 42 and the evaporator 43 are accommodated for collecting condensed water produced from the condenser 42 and the evaporator 43. Although the first water collector 53a is shown as being arranged in a lower portion of the lower outlet duct 53, it is not limited thereto. For example, an extra tray placed in the machine room 12 may serve as the first water collector.

Furthermore, a water discharge tray 82 is installed below the drain outlet 11h for collecting water brought in through the drain outlet 11h.

The water discharge tray 82 includes a bottom plane 82a formed as an inclined plane to guide the water to the first water collector 53a in the machine room 12. As the machine room 12 is shown as being placed on the right side of the water discharge tray 82, the bottom plane 82a of the water discharge tray 82 is formed to be tilted down to the left toward the first water collector 53a located in a lower portion of the machine room 12. The inclination angle θ1 of the bottom plane 82a of the water discharge tray 82 is about 9 degrees to the horizontal plane. Although the inclination angle θ1 of the bottom plane 82a of the water discharge tray 82 is described as being about 9 degrees, it is not limited thereto. When the inclination angle θ1 of the bottom plane 82a of the water discharge tray 82 is equal to or greater than 5 degrees, water may flow down across the bottom plane 82a of the water discharge tray 82.

The drain system 80 may include a pump 81 for pumping water to be discharged to the water discharge tub 13, water collecting pipes 83 and 84 for collecting the water into the first water collector 53a, and drain pipes 85 and 86 for discharging the water of the first water collector 53a to the water discharge tub 13.

A water level sensor 87 may be arranged in the first water collector 53a for detecting a level of water collected in the first water collector 53a. When the water level sensor 87 detects that a level of the water collected in the first water collector 53a is equal to or higher than a certain level, the pump 81 is operated for the water collected in the first water collector 53a to be discharged to the water discharge tub 13.

The water collecting pipes 83 and 84 may include a first water collecting pipe 83 having one end coupled to the water discharge tray 82 and the other end coupled to the first water collector 53a, and a second water collecting pipe 84 having one end coupled to the second water collector 54a and the other end coupled to the lower outlet duct 53.

The first water collector 53a is located lower than the lowest portion of the bottom plane 82a of the water discharge tray 82, and the first water collecting pipe 83 has an end connected to the lowest portion of the bottom plane 82a of the water discharge tray 82 and is tilted down to a side where the machine room 12 is located. As shown in FIG. 5, the bottom plane 82a of the water discharge tray 82 is formed to be tilted down to the right, so the first water collecting pipe 83 has one end connected to a right end of the bottom plane of the water discharge tray 82, and extends downward to the right until the other end of the first water collecting pipe 83 is connected to the first water collector 53a. Accordingly, the water collected in the water discharge tray 82 is moved by gravity to the first water collector 53a through the first water collecting pipe 83.

The second water collector 54a is located higher than the first water collector 53a. As the second water collecting pipe 84 is connected to the lower outlet duct 53 that defines the first water collector 53a, the second water collecting pipe 84 is connected to the first water collector 53a through the lower outlet duct 53.

The drain pipes 85 and 86 may include a first drain pipe 85 having one end coupled to the first water collector 53a and the other end coupled to the pump 81, and a second drain pipe 86 having one end coupled to the pump 81 and the other end coupled to the water discharge tub 13.

Accordingly, the water collected in the water discharge tray 82 and the second water collector 54a is moved to the first water collector 53a through the water collecting pipes 83 and 84, collected in the first water collector 53a, and discharged to the water discharge tub 13 through the drain pipes 85 and 86 according to operation of the pump 81.

Although the first water collecting pipe 83 is shown as having one end coupled to the water discharge tray 82 and the other end coupled to the first water collector 53*a*, it is just an example without being limited thereto.

Furthermore, the drain outlet 11*h* is formed in a front portion of the second bottom plane 116, but it is not limited thereto. For example, the drain outlet 11*h* may be formed at various locations on the second bottom plane 116.

For example, the drain outlet may be formed in a front end portion, a rear end portion, or at least one end on both sides of the second bottom plane 116. Specifically, the drain outlet may be formed in a rear end portion of the second bottom plane 116, or formed in each of the front and rear end portions of the second bottom plane 116. Furthermore, the drain outlet may be formed in one of left and right end portions of the second bottom plane 116, or formed in each of the front and rear end portions of the second bottom plane 116. Moreover, the drain outlet may be formed at the center of the second bottom plane 116, or formed at one of the four corners of the second bottom plane 116.

Even when the drain outlet is formed at any of the different positions as described above, other portions on the second bottom plane 116 where the drain outlet is not formed are formed as an inclined plane tilted down toward the drain outlet to guide water to the drain outlet.

For example, when the drain outlet is formed in a rear end portion of the second bottom plane 116, the second bottom plane 116 may be formed as an inclined plane tilted down from the front to the back, and when the drain outlet is formed in an end portion on the right side of the second bottom plane 116, the second bottom plane 116 may be formed as an inclined plane tilted down from the left end of the second bottom plane 116 to the right. Furthermore, when the drain outlet is installed at the center of the second bottom plane 116, the second bottom plane 116 may be formed to be tilted down from the four edges, i.e., front, rear, left and right ends of the second bottom plane 116 to the center. Moreover, when the drain outlet is formed at one of the four corners of the second bottom plane 116, the second bottom plane 116 may be formed to be tilted down from the other three corners to the corner.

When there are a plurality of drain outlets formed on the second bottom plane 116, the water discharge tray 82 is installed underneath each of the drain outlets for guiding water drained through the drain outlet to the first water collector 53*a* or the pump 81.

Figure 6:
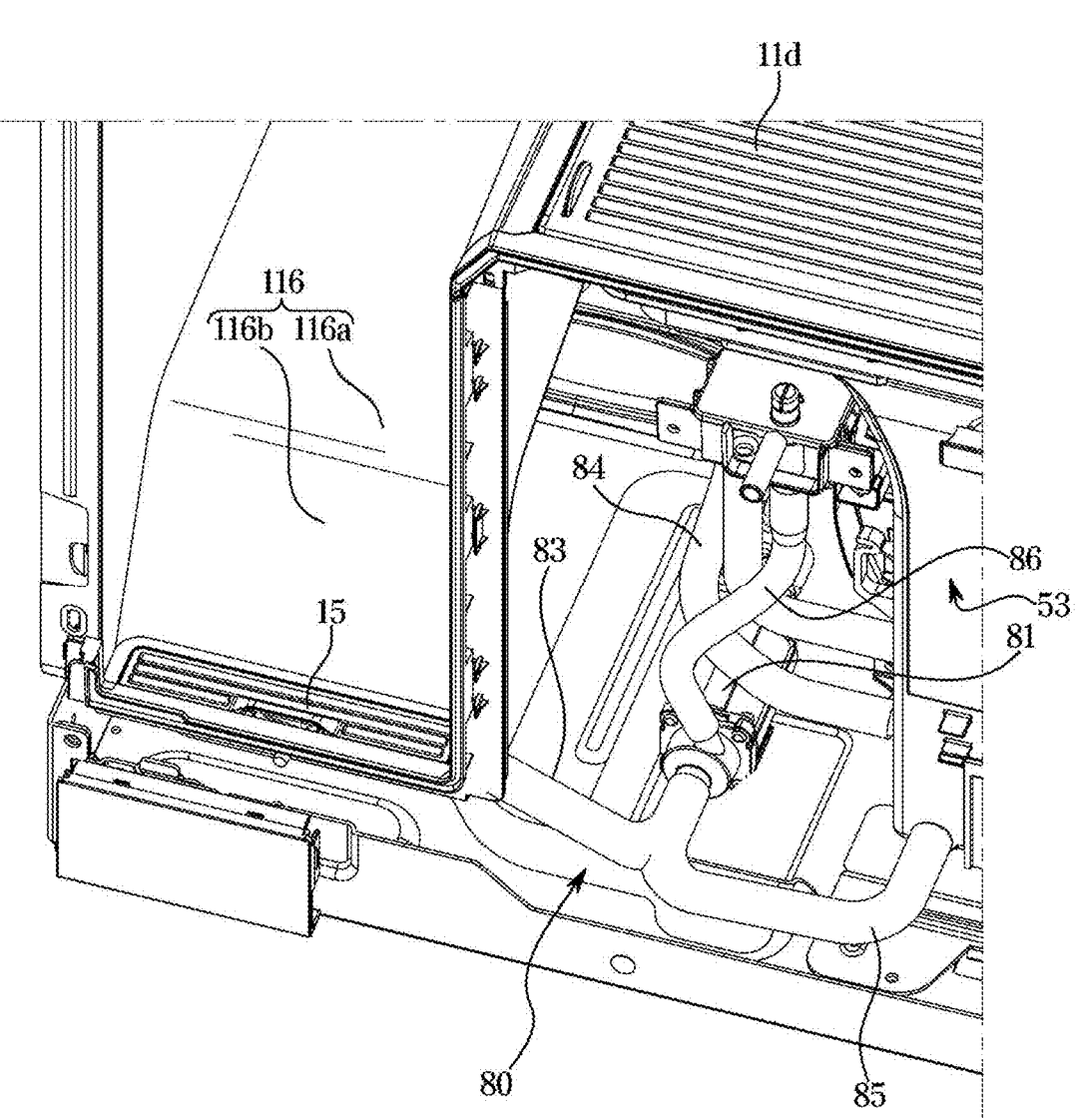
FIG. 6 illustrates a front view of a drain system included in a garment care apparatus, according to another embodiment of the disclosure.

As shown in FIG. 6, the first water collecting pipe 83 may have one end connected to the water discharge tray 82 and may be tilted down toward the first drain pipe 85, and have the other end connected to a middle of the first drain pipe 85.

Although the first inclined portion 116*a* of the second bottom plane 116 is tilted toward the lower front in this embodiment, it is not limited thereto.

Figure 7:
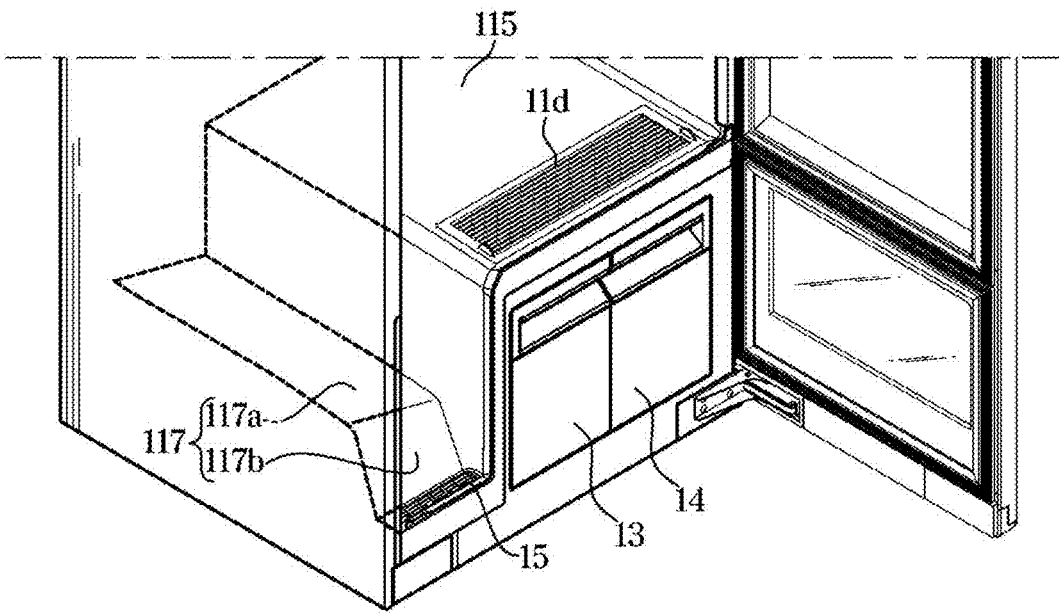
FIG. 7 illustrates a perspective view of a garment care apparatus illustrating a second bottom plane of a second area, according to another embodiment of the disclosure.
Figure 8:
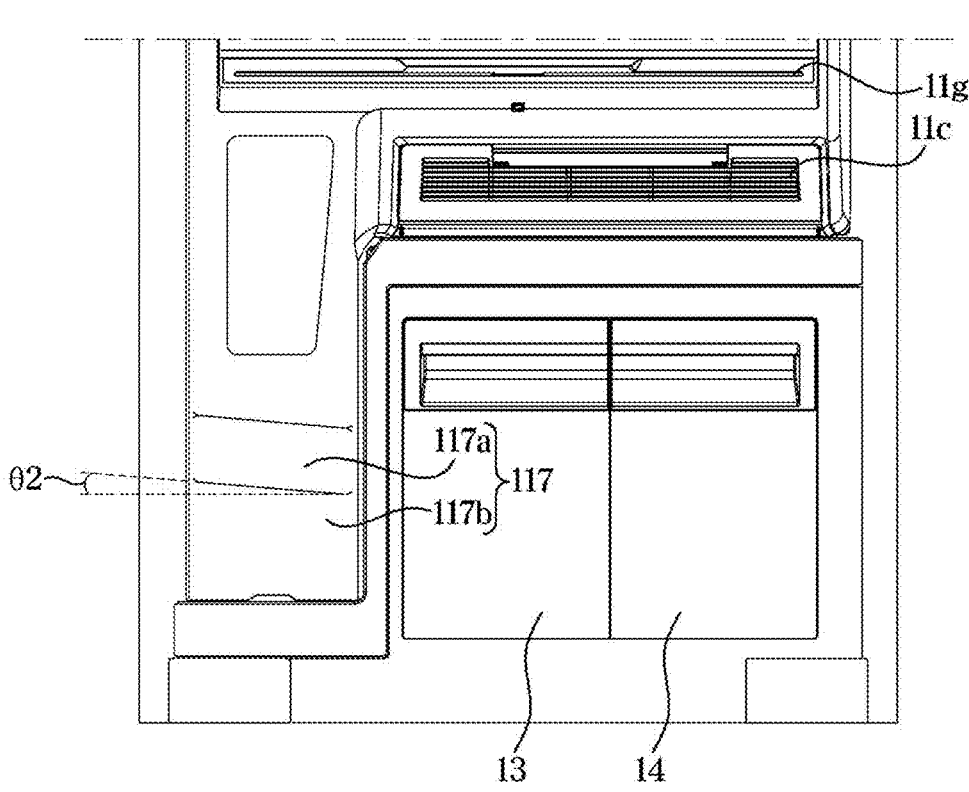
FIG. 8 illustrates a front view of a garment care apparatus illustrating a second bottom plane of a second area, according to another embodiment of the disclosure.

Referring to FIGS. 7 and 8, a second bottom plane 117 includes a first inclined portion 117*a* and a second inclined portion 117*b*. In this case, the first inclined portion 117*a* may be tilted down toward the lower front and also tilted down from the side wall of the care chamber 11 toward the machine room 12 at an inclination angle θ2. In FIGS. 7 and 8, as the machine room 12 is located on the lower right of the care chamber 11, the first inclined portion 117*a* is tilted down to the right from the left wall of the care chamber 11.

With the first inclined portion 117*a* formed as described above, water is moved and collected to the machine room 12 while moving across the first inclined portion 117*a* to the front, thereby allowing the water to be moved faster.

Accordingly, the water may quickly pass the second bottom plane 117 of the care chamber 11 and may be guided to the drain outlet 11*h*.

According to the disclosure, a garment care apparatus may accommodate and care for garments with normal length in a first area and garments longer than the normal length in a second area.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A garment care apparatus comprising:
a main body; and
a care chamber arranged in the main body and configured to accommodate garments,
wherein the care chamber comprises:
   a first area including a first bottom surface,
   a second area including a second bottom surface located lower than the first bottom surface,
   a drain outlet arranged in front of the second bottom surface and configured to discharge water,
   a machine room arranged below the first area,
   a lower outlet arranged on the first bottom surface,
   a lower outlet duct configured to guide air discharged through the lower outlet,
   a first water collector arranged in a lower portion of the lower outlet duct and configured to collect water brought into the lower outlet duct, and
   a water discharge tray installed below the drain outlet configured to collect water brought in through the drain outlet, and
   wherein the first water collector is located lower than the water discharge tray.

2. The garment care apparatus of claim 1, further comprising:
a filter net arranged at the drain outlet to filter foreign materials; and
a grill member configured to cover and hide the filter net.

3. The garment care apparatus of claim 1, further comprising:
a water discharge tub into which water is discharged;
a pump configured to pump the water to be discharged into the water discharge tub;
a first drain pipe configured to guide water from the first water collector to the pump;
a second drain pipe configured to guide water discharged from the pump to the water discharge tub; and
a first water collecting pipe tilted down toward the first drain pipe, the first water collecting pipe comprising one end coupled to the water discharge tray and another end coupled to the first drain pipe.

4. The garment care apparatus of claim 1, wherein the water discharge tray comprises a bottom plane tilted down toward the first water collector.

5. The garment care apparatus of claim 1, further comprising: a first water collecting pipe tilted down toward the first water collector, the first water collecting pipe comprising one end coupled to the water discharge tray and another end coupled to the first water collector.

6. The garment care apparatus of claim 1, further comprising:
   an evaporator and a condenser configured to dehumidify air; and
   a lower blower configured to force air past the evaporator and the condenser.

7. The garment care apparatus of claim 6, wherein:
   the lower blower comprises:
      the lower outlet duct,
      a lower fan configured to force air to flow, and
      a lower inlet duct configured to guide air discharged from the lower fan to the care chamber and accommodate the evaporator and the condenser, and
   the lower inlet duct comprises a second water collector arranged below a space in which the evaporator and the condenser are accommodated, the second water collector configured to collect water.

8. The garment care apparatus of claim 7, further comprising a second water collecting pipe, the second water collecting pipe comprising one end coupled to the second water collector and another end coupled to the lower outlet duct.

9. The garment care apparatus of claim 1, wherein the second bottom surface includes an inclined plane tilted down from a rear wall of the care chamber to the drain outlet.

10. The garment care apparatus of claim 9, wherein the second bottom surface comprises:
   a first inclined portion extended from the rear wall of the care chamber at a first inclination angle; and
   a second inclined portion extended from a front end of the first inclined portion at a second inclination angle greater than the first inclination angle.

11. The garment care apparatus of claim 10, wherein the first inclined portion is tilted down from a side of the care chamber toward the machine room.

12. The garment care apparatus of claim 1, further comprising:
   a lower inlet configured to introduce the discharged air into the care chamber,
   wherein the lower outlet is arranged in a front side of the first bottom surface,
   wherein the lower inlet is arranged at a back side of the first bottom surface, and
   wherein the drain outlet is disposed lower than the lower outlet and the lower inlet.

13. A garment care apparatus comprising:
   a main body; and
   a care chamber arranged in the main body and configured to accommodate garments,
   wherein the care chamber comprises:
      a first area having a first vertical length,
      a second area located side by side with the first area and having a second vertical length greater than the first vertical length,
      a machine room arranged below the first area,
      a lower outlet arranged on a bottom plane of the first area,
      a lower outlet duct configured to guide air discharged through the lower outlet, a first water collector arranged in a lower portion of the lower outlet duct and configured to collect water brought into the lower outlet duct, and
   a water discharge tray,
   wherein the second area includes a bottom plane at which a drain outlet is arranged, the drain outlet configured to discharge water,
   wherein the bottom plane of the second area includes an inclined plane tilted down toward the drain outlet, and
   wherein the water discharge tray is installed below the drain outlet configured to collect water brought in through the drain outlet, and
   wherein the first water collector is located lower than the water discharge tray.

14. The garment care apparatus of claim 13, wherein:
   the drain outlet is arranged in a front end portion of the bottom plane of the second area, and
   the bottom plane of the second area is tilted down from a rear wall of the care chamber toward the drain outlet located in the front end portion of the bottom plane of the second area.

15. The garment care apparatus of claim 14, wherein the bottom plane of the second area comprises:
   a first inclined portion extended from the rear wall of the care chamber at a first inclination angle; and
   a second inclined portion extended from a front end of the first inclined portion at a second inclination angle greater than the first inclination angle.

16. The garment care apparatus of claim 15, wherein the first inclined portion is tilted down from a side of the care chamber toward the machine room.

17. The garment care apparatus of claim 16, further comprising:
   a first water collecting pipe, the first water collecting pipe comprising one end coupled to the water discharge tray and another end coupled to the first water collector.

18. The garment care apparatus of claim 17, wherein the water discharge tray comprises a bottom plane tilted down toward the first water collector.

19. The garment care apparatus of claim 17, further comprising:
   an evaporator and a condenser configured to dehumidify air;
   a second water collector arranged below the evaporator and the condenser and located higher than the first water collector; and
   a second water collecting pipe, the second water collecting pipe comprising one end coupled to the second water collector and another end coupled to the first water collector.

20. The garment care apparatus of claim 19, further comprising:
   a water discharge tub into which water is discharged;
   a pump configured to force water to be discharged into the water discharge tub;
   a first drain pipe, the first drain pipe comprising one end coupled to the first water collector and an other end coupled to the pump; and
   a second drain pipe, the second drain pipe comprising one end coupled to the pump and another end coupled to the water discharge tub.

* * * * *